United States Patent
Garrido et al.

(10) Patent No.: US 10,870,373 B2
(45) Date of Patent: Dec. 22, 2020

(54) ACCIDENT MONITORING IN A CHILD SAFETY SEAT

(71) Applicant: Suzhou Swandoo Children's Articles Co., Ltd., Jiangsu (CN)

(72) Inventors: Nicolas Gonzalez Garrido, Vienna (AT); Ivan Petrovic, Cacak (RS); Vojislav Mokric, Grocka (RS); Srdjan Jovanovic, Zemun (RS)

(73) Assignee: Suzhou Swandoo Children's Articles Co., Ltd., Jiangsu (CN)

( * ) Notice: Subject to any disclaimer, the term of this patent is extended or adjusted under 35 U.S.C. 154(b) by 0 days.

(21) Appl. No.: 16/299,061

(22) Filed: Mar. 11, 2019

(65) Prior Publication Data

US 2019/0299822 A1    Oct. 3, 2019

Related U.S. Application Data

(63) Continuation of application No. PCT/CN2017/101458, filed on Sep. 12, 2017.

(30) Foreign Application Priority Data

Sep. 12, 2016   (CN) .......................... 2016 1 0817633
Sep. 12, 2016   (CN) ..................... 2016 2 1050426 U
(Continued)

(51) Int. Cl.
*B60Q 1/00*     (2006.01)
*B60N 2/28*     (2006.01)
(Continued)

(52) U.S. Cl.
CPC ........... *B60N 2/2884* (2013.01); *B60N 2/002* (2013.01); *B60N 2/2821* (2013.01);
(Continued)

(58) Field of Classification Search
CPC ............... B60N 2/2884; B60N 2/2845; B60R 21/0132; G01P 15/00; G01S 19/13
See application file for complete search history.

(56) References Cited

U.S. PATENT DOCUMENTS 6,689,962 B2    2/2004  Breed et al.
7,439,866 B2 *  10/2008  Wallner ............... B60N 2/2806
                                                   180/271
(Continued)

FOREIGN PATENT DOCUMENTS

CN    201562339 U    8/2010
CN    202123951 U    1/2012
(Continued)

OTHER PUBLICATIONS

Sane, Namrata H., et al., Real Time Vehicle Accident Detection and Tracking Using GPS and GMS; International Journal on Recent and Innovation Trends in Computing and Communication; vol. 4; Issue: 4; Apr. 2016; ISSN: 2321-8169; Available at https://www.semanticscholar.org/paper/Real-Time-Vehicle-Accident-Detection-and-Tracking-Sane/26d94732e35310e06b8dd66454000853bbbd267f.
(Continued)

*Primary Examiner* — Toan N Pham
(74) *Attorney, Agent, or Firm* — Brian M. Dingman; Dingman IP Law, PC

(57) ABSTRACT

A child safety seat accident detection system that has a device such as an accelerometer for determining an acceleration of the seat, and a processor, operably connected to the device for determining an acceleration of the seat, and that is configured to judge, based at least on the determined acceleration, if the seat has been in a motor vehicle accident.

19 Claims, 7 Drawing Sheets

(30) Foreign Application Priority Data

Sep. 12, 2016  (CN) .................... 2016 2 1050502 U
Sep. 12, 2016  (CN) .................... 2016 2 1050638 U

(51) Int. Cl.

| | |
|---|---|
| *G01P 15/00* | (2006.01) |
| *G01S 19/13* | (2010.01) |
| *G08B 25/08* | (2006.01) |
| *G08B 25/01* | (2006.01) |
| *B60N 2/00* | (2006.01) |
| B60R 21/0132 | (2006.01) |
| B62B 9/00 | (2006.01) |
| B62B 9/10 | (2006.01) |
| B62B 9/24 | (2006.01) |

(52) U.S. Cl.

CPC ......... *B60N 2/2845* (2013.01); *B60N 2/2848* (2013.01); *G01P 15/00* (2013.01); *G01S 19/13* (2013.01); *G08B 25/016* (2013.01); *G08B 25/08* (2013.01); *B60R 21/0132* (2013.01); *B62B 9/005* (2013.01); *B62B 9/102* (2013.01); *B62B 9/24* (2013.01)

(56) References Cited

U.S. PATENT DOCUMENTS

| | | | |
|---|---|---|---|
| 8,044,782 B2 | 10/2011 | Saban | |
| 8,768,292 B2 | 7/2014 | Welch | |
| 8,970,362 B2 | 3/2015 | Morley et al. | |
| 9,139,128 B1 | 9/2015 | Lemons et al. | |
| 9,845,050 B1* | 12/2017 | Garza | G08B 21/0205 |
| 2003/0062996 A1 | 4/2003 | Flanagan et al. | |
| 2005/0030224 A1 | 2/2005 | Koch | |
| 2006/0057900 A1* | 3/2006 | Lawrence | B60N 2/002 |
| | | | 439/824 |
| 2012/0232749 A1* | 9/2012 | Schoenberg | B60N 2/002 |
| | | | 701/36 |
| 2012/0319442 A1 | 12/2012 | Clement | |
| 2013/0033373 A1 | 2/2013 | Thomas | |
| 2013/0049955 A1 | 2/2013 | Hoover et al. | |
| 2013/0062916 A1 | 3/2013 | Wiley | |
| 2014/0015664 A1 | 1/2014 | Watson | |
| 2014/0361889 A1 | 12/2014 | Wall, II et al. | |
| 2016/0379459 A1* | 12/2016 | Trang | G08B 21/023 |
| | | | 340/457 |
| 2018/0072198 A1* | 3/2018 | Garnier | B60R 21/18 |
| 2018/0354443 A1* | 12/2018 | Ebrahimi | B60R 22/105 |

FOREIGN PATENT DOCUMENTS

| | | |
|---|---|---|
| CN | 103786608 A | 5/2014 |
| CN | 103863235 A | 6/2014 |
| CN | 105172628 A | 12/2015 |
| CN | 105438025 A | 3/2016 |
| CN | 20520430 U | 5/2016 |
| CN | 105539219 A | 5/2016 |
| CN | 106314211 A | 1/2017 |
| CN | 206049435 U | 3/2017 |
| FR | 2997352 A1 | 5/2014 |
| JP | H0830885 A | 2/1996 |
| JP | 2016163340 A | 9/2016 |

OTHER PUBLICATIONS

The International Preliminary Report on Patentability and the Written Opinion of the International Searching Authority dated Mar. 12, 2019 for PCT Application PCT/CN2017/101458.

The International Search Report and Written Opinion of the International Searching Authority dated Dec. 25, 2017 for PCT/CN2017/101458.

Supplementary European Search Report issued by the European Patent Office completed Jan. 22, 2020 for Application No. 17848194.1-1010/3509903 PCT/CN2017/101458.

The International Preliminary Report on Patentability dated Mar. 12, 2019 by the International Bureau of WIPO for PCT Application No. PCT/CN2017/101460.

The International Preliminary Report on Patentability dated Mar. 12, 2019 by the International Bureau of WIPO for PCT Application No. PCT/CN2017/101461.

The International Search Report and the Written Opinion of the International Searching Authority dated Dec. 14, 2017 for PCT Application No. PCT/CN2017/101460.

The International Search Report and the Written Opinion of the International Searching Authority dated Dec. 19, 2017 for PCT Application No. PCT/CN2017/101461.

\* cited by examiner

ACCIDENT MONITORING IN A CHILD SAFETY SEAT

CROSS-REFERENCE TO RELATED APPLICATION

This application is a continuation of and claims priority of International Patent Application PCT/CN2017/101458 filed on 12 Sep. 2017, the contents of which are incorporated herein by reference.

BACKGROUND

This application relates to a child safety seat, in particular to a child safety seat provided with an accident monitoring device.

With the development of science and technology and the growth of the living standard, automobiles have become indispensable vehicles. Passenger safety is a critical issue with automobiles. Generally, safety measures in automobiles, such as safety belts and safety air bags, are mostly designed according to the heights and weights of adults. If children are seated on the front seat and a safety belt is used, since the heights and weights of children are different from those of adults, injuries to children can be made worse instead of being relieved. Therefore, safety measures specially designed for children are needed.

Child safety seats are used to seat children in automobile seats. Child safety seats are provided with restraint equipment that is designed to restrain the child so as to guarantee the safety of the child to the maximum extent when a car accident happens. However, when a car accident happens there may be a need for a responsible adult other than the driver to be informed of the accident so that the condition of the child in the car seat can be quickly addressed.

SUMMARY

All examples and features mentioned below can be combined in any technically possible way.

In one aspect, a child safety seat accident detection system includes a device for determining an acceleration of the seat, and a processor, operably connected to the device for determining an acceleration of the seat, and that is configured to judge, based at least on the determined acceleration, if the seat has been in a motor vehicle accident.

Embodiments may include one of the following features, or any combination thereof. The seat may comprise a seat body, and a handle coupled to the seat body, and the device for determining an acceleration of the seat may be located on or in the seat body or the handle. The device for determining an acceleration of the seat may comprise an inertial measurement unit (IMU) that comprises at least one accelerometer and at least one rotation sensor. The processor may be configured to judge if the seat has been in a motor vehicle accident based on both the determined acceleration and a time over which an acceleration has occurred. The processor may judge that the seat has been in a motor vehicle accident if the determined acceleration at least meets a threshold acceleration, and the time is less than a threshold time. The processor may judge that the seat has not been in a motor vehicle accident if the determined acceleration is less than the threshold acceleration, or the time is at least as great as the threshold time.

Embodiments may include one of the following features, or any combination thereof. The child safety seat accident detection system may further comprise a wireless communication device that is operably coupled to the processor, wherein the wireless communication device is configured to send an accident notification to a third party. The processor may be further configured to search for pre-established third-party contact persons, and then enable the communication device to send the accident notification to at least one such third party. The communication device may be configured to send the accident notification by a short message service (SMS) form. The processor may be further configured to await a reply from the contacted person, and if no reply is received within a predetermined time to enable the communication device to send the accident notification to another person. The child safety seat accident detection system may further comprise a mobile device application that runs on a mobile device and is configured to communicate with the processor, wherein the mobile device application is configured to allow the user to dismiss an accident notification, for example if the recipient is in the motor vehicle and receives an accident notification from the car seat, but no accident has occurred.

Embodiments may include one of the following features, or any combination thereof. The child safety seat accident detection system may further comprise a global positioning system (GPS) device that is configured to determine a position of the child safety seat and provide the position to the processor. The GPS device may comprise a GPS antenna and a GPS sensor operably connected to the GPS antenna, wherein the GPS antenna is configured to receive GPS satellite signals, and the GPS sensor is configured to determine a position based on the satellite signals, and input the position information to the processor. The child safety seat accident detection system may further comprise a child detection device that is configured to detect whether or not a child is located in the child safety seat. The child detection device may comprise an infrared sensor. The child safety seat may comprise a basket, and a handle coupled to the basket, and the child detection device may be located in the handle. The child detection device may comprise a proximity sensor.

In another aspect, a child safety seat accident detection system includes an inertial measurement unit (IMU) that comprises at least one accelerometer for detecting acceleration and at least one rotation sensor for detecting rotation, where the IMU is located in or on the child safety seat. There is a processor, operably connected to the IMU, and that is configured to judge, based at least on one of a determined acceleration and a determined rotation, if the seat has been in a motor vehicle accident. The processor is configured to judge if the seat has been in a motor vehicle accident based on both the determined acceleration and a time over which an acceleration has occurred. The processor judges that the seat has been in a motor vehicle accident if the determined acceleration at least meets a threshold acceleration, and the time of the acceleration is less than a threshold time. The processor judges that the seat has not been in a motor vehicle accident if the determined acceleration is less than the threshold acceleration, or the time is at least as great as the threshold time. There is a global positioning system (GPS) device that is configured to determine a position of the child safety seat and provide the position to the processor, wherein the GPS device comprises a GPS antenna and a GPS sensor operably connected to the GPS antenna, wherein the GPS antenna is configured to receive GPS satellite signals. The GPS sensor is configured to determine a position based on the satellite signals, and input the position information to the processor. There is a wireless communication device that is operably coupled to the processor, wherein the wireless communication device is configured to send an accident notification to a third party, wherein the accident notification includes the position of the child safety seat.

Embodiments may include one of the above and/or below features, or any combination thereof. The seat may have a seat body, and a handle coupled to the body, wherein the IMU is in the handle. The child safety seat accident detection system may further comprise a hub located in the motor vehicle and comprising a hub IMU, where the hub is configured to wirelessly transmit accelerations sensed by the hub IMU to the processor.

DETAILED DESCRIPTION

Figure 1:
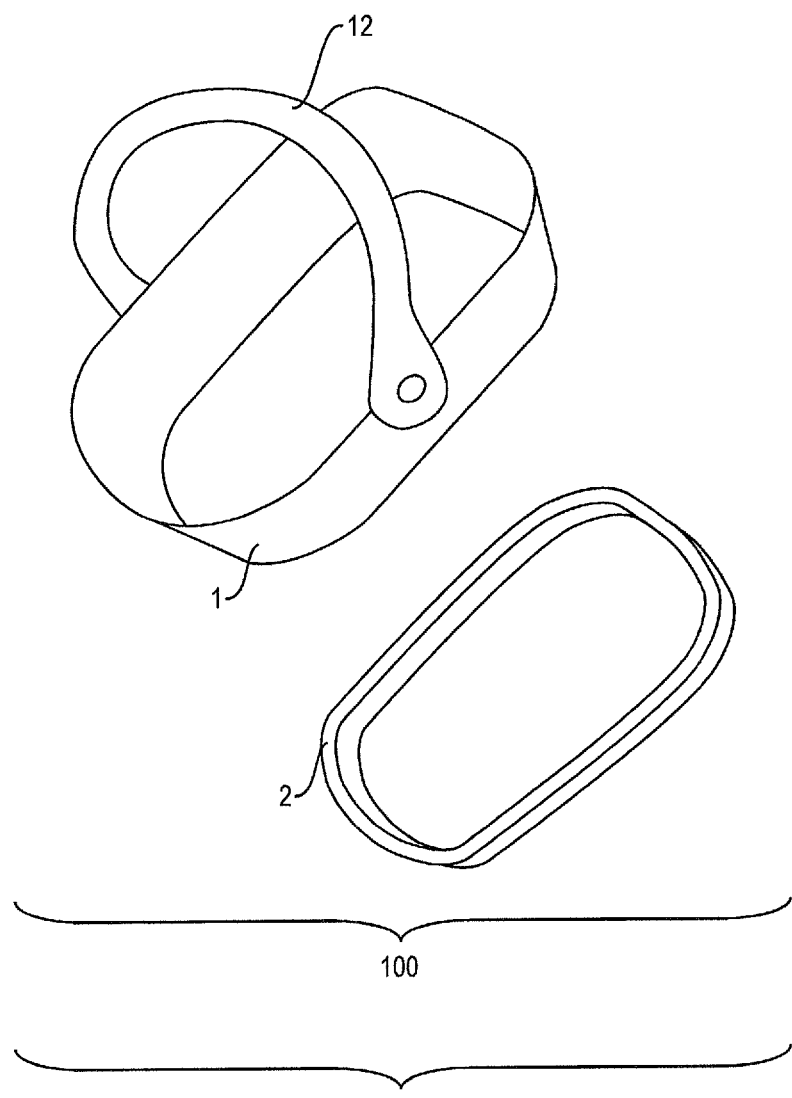
FIG. 1 is a disassembled perspective view of a child transportation device that includes a child seat and a base.

The present disclosure aims to overcome the defects of the prior art and provide a child safety seat with built-in accident monitoring capabilities. This way, driving accidents can be monitored, and a notification and/or an alarm can be provided on the occurrence of an accident. Also, an accurate position of the motor vehicle can be provided to responsible adults when an accident happens.

In order to achieving the above purposes and objectives, a child safety seat is provided with an accident monitoring capability. The accident monitoring capability can be accomplished with an accident monitoring module arranged on or in the body of a child car seat. The accident monitoring module may comprise one or more accelerometers or other devices that are able to measure acceleration, and/or one or more rotation sensors that are able to measure rotation about an axis. Accelerometers and rotation sensors can both be parts of one or more inertial measurement units (IMUs). A micro-control processing unit (e.g., a microcontroller or a microprocessor) is operably connected to the inertial measurement unit. A communication unit is operably connected to the microprocessor. The IMU can be used to measuring movements of the child seat. The measured movements can be transmitted to the microprocessor. The microprocessor can develop accident information by analyzing and processing the movement data. It can then send the accident information to the communication unit. The communication unit can send accident notifications to one or more third parties, such as responsible adults, civil authorities such as emergency services, and/or an insurance company.

The inertial measurement unit may comprise one or more of gyroscopes and accelerometers. One or more accelerometers can be used for measuring the longitudinal acceleration (i.e., the acceleration in the direction of travel) of the car seat. One or more rotational sensors can be used to measure the rotational motion(s) of the car seat.

The microprocessor may include a data processing capability as well as a searching and forwarding capability. The data processing capability can provide the ability to judge whether an accident has happened or not, such as by analysis of the car seat motion data and/or the use of a mobile device application. The searching and forwarding capability can allow for a search for pre-determined emergency contact person(s)/entities, and the ability to send the accident information, or a notification of an accident, to the contact persons/entities via the communication unit.

The communication unit can include a mobile communication unit, which can send the accident information to the preset contact persons in a short message service (SMS) form, or email, or any other now-known or future-developed form of wireless communication.

The accident monitoring capability may also include a positioning unit that is able to determine and record the physical position of a motor vehicle accident, and provide it to the microprocessor. A GPS positioning unit may include a GPS antenna and a GPS sensor connected with the GPS antenna, where the GPS antenna is used for receiving satellite signals, and the GPS sensor determines specific position information according to the satellite signals and inputs the position information to the microprocessor. Alternatively, or additionally, the positioning unit can use A-GPS technologies, or GSM triangulation, or other now-known or future-developed location devices/services.

The accident monitoring capability may also include the ability to detect whether or not a child is positioned in the car seat. This may be accomplished with one or more proximity sensors. Proximity sensing may be accomplished using infrared sensors that are located on the seat (or as a separate device located elsewhere in the vehicle, in wireless communication with the car seat system) with a viewing angle that includes the location where a child would normally be found. In one non-limiting example, the proximity sensor(s) can be located on the handle of a car seat, which is typically located over the open top of the car seat. Other currently available but non-limiting manners of detecting the presence of a child on board (even when the car seat is not present) include accessories such as infrared sensors, motion detectors, cameras, pressure sensors, and near-field communication (NFC) (such as on a child's bracelet). These could be enabled to communicate directly with the accident detection components, or indirectly, such as via a mobile device app.

The disclosure has one or more of the following beneficial effects. Traffic accidents can be monitored, an alarm can be given, and position information can be sent to others who might be in a position to help. Accordingly, a child in the seat has a greater opportunity to be rescued after an accident.

A child safety seat provided with an accident monitoring capability can comprise a seat body, and an accident monitoring module arranged on or in the seat body. The accident monitoring module may comprise an inertial measurement unit (IMU) of a type known in the field. There may also be a micro-control processing unit (e.g., a microcontroller or a microprocessor), and a communication unit. The IMU is operably connected to the microprocessor. The IMU is used to measure child safety seat motions, and transmit the motion data to the microprocessor. The microprocessor is operably connected to the communication unit. The microprocessor obtains accident information by analyzing and processing the movement data received from the IMU. The accident information is sent out through the communication unit. This accomplishes an alarm that can alert others that a child in the motor vehicle needs assistance.

The IMU can comprise an accelerometer that is positioned to measure the acceleration of the seat in the direction of travel of the motor vehicle. The measured acceleration can be transmitted to the microprocessor, to be analyzed to determine whether or not an accident has happened.

The microprocessor can include a data processing capability, and a searching and forwarding capability, as mentioned above. Data processing can be used to analyze and judge whether or not an accident has happened based at least on the measured acceleration(s). In one example, the microprocessor can include two predetermined accident states. One state is a "real accident" state in which the IMU data is judged to result from an actual accident. The other state is a "non-real" accident state in which the IMU data is judged not to result from an actual accident. When a potential accident is judged to be a non-real accident, the microprocessor determines that no car accident has happened, and the searching and forwarding capability is not required to begin an alarm sequence. When a potential accident is judged to be a real accident, accident information is generated, and the searching and forwarding capability immediately sends the accident information to one or more relevant contact person (s) through the communication unit. The relevant contact persons can be inputted by the user and typically include the police, other emergency services, close relatives or friends, insurance companies, and others. In one example, after the accident information is sent to a first contact person, if the first contact person does not provide a relevant response within a predetermined time period, the accident information is immediately forwarded to a preset second contact person. The process continues until at least one relevant contact person receives the accident information and acknowledges its receipt. Other options for operation of the notification function are described elsewhere herein.

The accident states can in one example be based on a combination of acceleration data and data regarding the time interval over which the event (the acceleration) occurred. Alternatively, the accident state can be based on only acceleration data and/or only rotation data. In one example, if the acceleration is greater than an acceleration threshold value, and the time over which the acceleration occurred is less than a time threshold value, the determination may be that there was a real accident. If the acceleration is less than the acceleration threshold and/or the time is greater than the time threshold, the data is judged to not be from an accident. As a non-limiting example, in one instance if the acceleration is at least 30 gravities (g), there is a potential accident. In the example, if the time interval over which the at least 30 g acceleration occurs is no greater than 3 milliseconds (ms), there is a determination of an actual, reportable accident. When the acceleration is less than 30 g and/or the acceleration event time interval is greater than 3 ms, the judgment is that there was no actual accident. Note that the particular acceleration and time limits are not limiting, but exemplary. For example, with a sampling rate of 1 kHz there are three samples in 3 ms, which likely provides enough redundancy to prevent false positives. In other words, if three contiguous readings are above the g limit, it is likely that the reading is valid.

In some cases, there can be both low-g and high-g accelerometers. This would allow the use of multiple acceleration thresholds (e.g., 30 g and 50 g), that can be interpreted to determine the severity of the accident. For example, if both the low g and high g limits are met, the accident is likely severe, whereas if only the lower g limit is met the accident may be less severe. The notification messages can be tailored to the accident severity.

An accident state can also be based on detected rotation. For example, rotation data from an IMU (in one, two, or all three mutually perpendicular axes) can be inspected to determine it exceeds an amount of rotation over a given time, indicative of a roll-over of the car seat. If a child is in the seat, for example as determined by a presence sensor, and the seat rolls over, there is a presumption that an accident has occurred. As with acceleration, rotation sensing can be (but need not be) tied to time for determination of whether there has been an actual accident. For example, a rotation of a certain amount (e.g., 180 degrees) over a short time can be determined to be caused by an actual car accident. Or, the rotation rate can be used rather than, or in addition to, the amount of rotation. As with acceleration, there can be multiple rotational thresholds used. The time threshold can be determined to be likely to be due to an accident rather than another cause such as an accidental tipping of the car seat.

As stated above, when an actual reportable accident is detected, the searching and forwarding capability is enabled to search for a contact person and send a notification that there has been an accident to the contact person. The contacted person can be required to return a notification receipt after receiving the accident information, preferably within a predetermined, short period of time. If the searching and forwarding unit capability does not receive a return receipt in a certain time, the searching and forwarding capability finds the next contact person and forwards the accident information. This process continues until a return receipt is received.

The child safety seat provided with the accident monitoring module disclosed herein is also suitable for child carrying seats such as a baby basket and a baby stroller. The accident monitoring device is arranged on the baby basket or the baby stroller to monitor whether an accident happens and give an alarm when an accident happens.

Figure 2A:
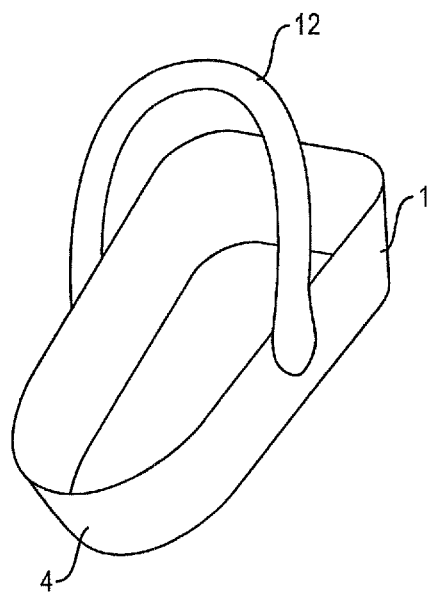
FIG. 2A is a perspective view and FIG. 2B is a side view of the child seat of FIG. 1.
Figure 2B:
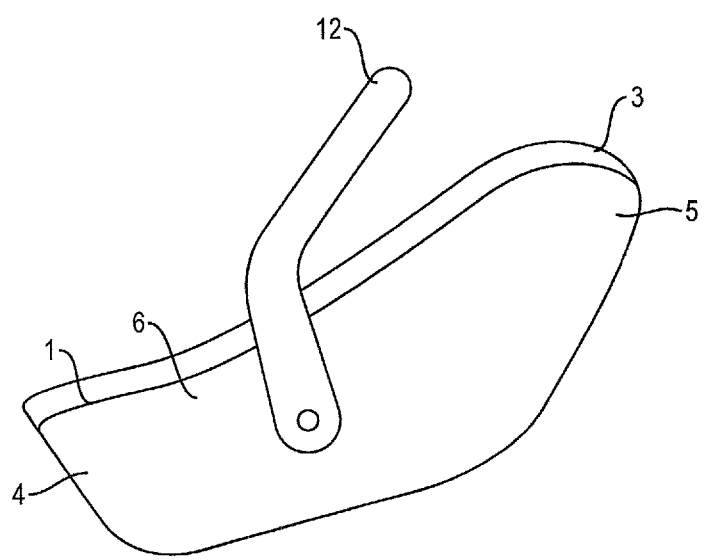
Figure 3:
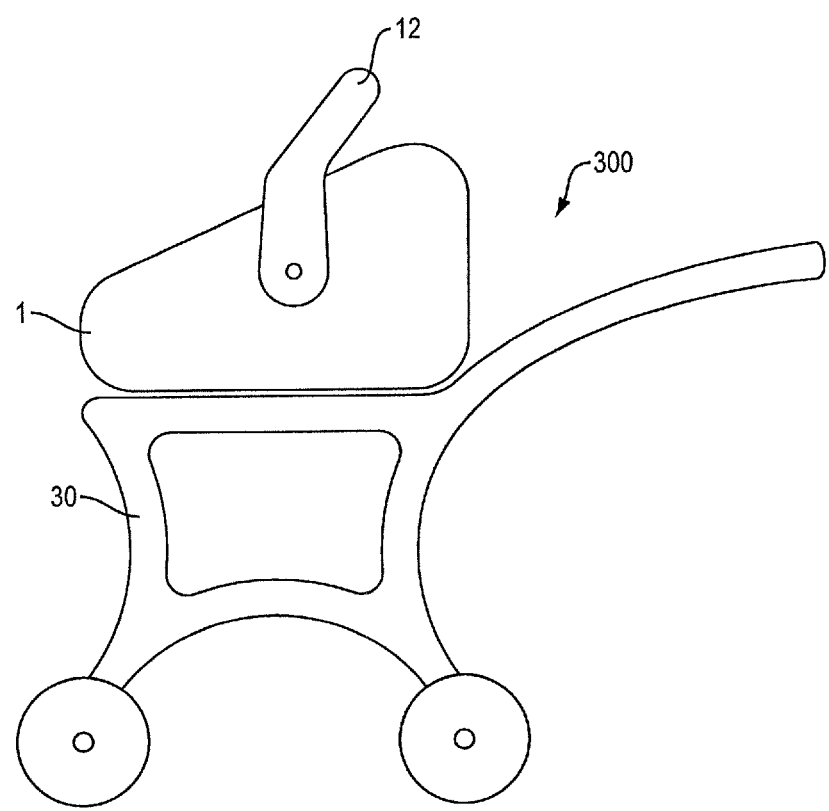
FIG. 3 is a side view of a child transportation device that is a stroller.

FIG. 1 illustrates an exemplary child transportation device (child seat) 100 that comprises hand basket 1 that is adapted to fit an infant or child, with pivoting carry handle 12. As is well-known, the basket can be carried by grasping the handle and lifting the basket off the ground or other surface on which the child seat is located. Basket 1 can be releasably coupled to base 2. In general, child seats are known in the art, so certain details of the seat will not be described herein. As best shown in FIGS. 2A and 2B, basket 1 includes shell 6 with front portion 4, rear portion 3, and lower rear portion 5. As shown in FIG. 3, basket 1 can also be removably mounted to stroller frame 30 to create a child stroller 300. This disclosure is not limited to any particular type of child transportation device, or to any particular type of child seat or basket, as the disclosure relates to accident monitoring in any type of child safety seat.

Figure 4:
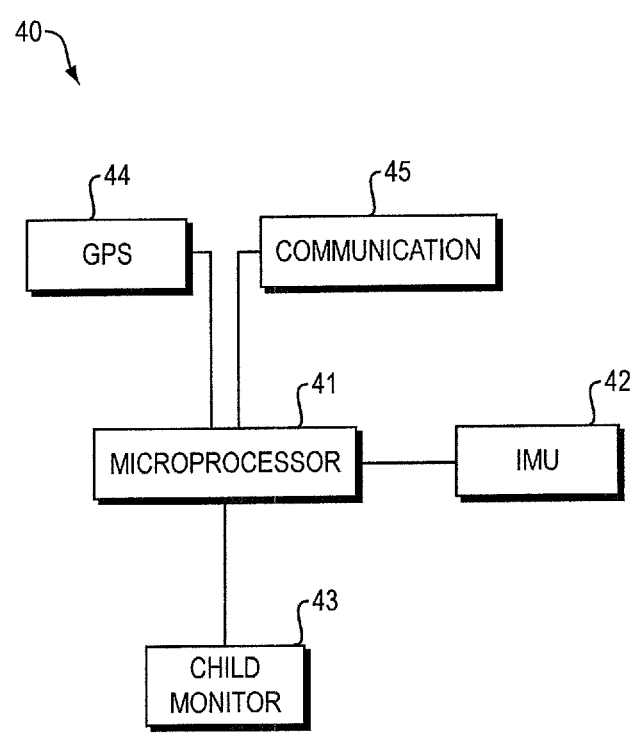
FIG. 4 is a functional block diagram of a child safety seat accident monitoring device.

FIG. 4 is a simplified functional block diagram of an accident monitoring system for the present disclosure. System 40 is able to detect when the car seat in which system 40 is mounted is in a motor vehicle accident. System 40 is able to contact a responsible adult in the case of an accident.

System 40 includes a processor (e.g., a microprocessor or microcontroller) 41 that receives acceleration and rotation signals from IMU 42. IMU 42 is preferably mounted securely in the car seat such that it is able to detect accelerations in the direction of travel of the motor vehicle in which the seat is mounted. As explained in more detail below, IMU 42 can be mounted on a printed circuit board (PCB) that is secured in the car seat such that an acceleration sense axis of the IMU is parallel to the longitudinal axis (the front-back axis) of the motor vehicle, when the car seat is properly secured to a car seat. Proper orientation of the car seat such that the accelerometer axis is properly aligned with the longitudinal axis of the motor vehicle can be determined separately, as may be necessary. IMU 42 also detects rotations about three mutually perpendicular axes, so that it is able to detect roll, pitch, and yaw of the car seat and thus the motor vehicle in which the seat is mounted. In alternative examples, IMU 42 senses only acceleration along the vehicle's longitudinal axis and/or rotation about an axis that is indicative of motor vehicle rollover. More generally, IMU 42 has the necessary motion sense functions and axial alignment needed to sufficiently determine car seat motions that have been determined to be due to the vehicle being in an "accident."

System 40 also includes communication function 45, which is configured to send accident notifications to one or more third parties. Communication function 45 can also be enabled to receive reply/confirmation messages from the third-party recipient(s), and pass them to microcontroller 41, as further described below. Communication function 45 can employ any one or more now-known or future-developed wireless communication technologies. In one example, communication is accomplished by SMS and/or via an HTTP message, such as by an RF transceiver.

System 40 also includes GPS function 44, which is enabled to determine the position of the car seat with a GPS antenna and sensor, as is well-known in the GPS field. Position information is provided to microprocessor 41. The position information can be used as part of the third-party accident notification, so the third party knows where the vehicle and car seat are located. As described above, position determination can be made by means other than GPS.

System 40 can also include child monitor function 43. Child monitor function 43 is configured to detect the presence of a child in the car seat, using any viable now-known or future-developed technology. Infrared (IR) or another type of proximity sensing is one means of detecting the presence of a human being in the car seat. One or more pressure sensors located under the car seat cushion can also be used as presence sensors. Child monitoring is useful but not necessary to the accident detection. Child monitoring is useful at least as a power-saving function. This can occur by enabling system 40 to detect potential accidents only when a child is in the car seat. If the car seat is not occupied, system 40 can enter a power-saving mode where the child monitor is periodically commanded to look for a child but the microprocessor, IMU, communication module, and GPS, are turned off, or are in low-power sleep mode. When a child is detected, the accident detection and notification functions (i.e., the microprocessor, the IMU, the communication, and the GPS), are enabled. This saves battery power in the car seat.

As described above, child monitoring could be accomplished with a separate accessory mounted so as to be useful to detect the presence of a child, such as on a door, window, ceiling, or other locations of the motor vehicle.

Figure 5:
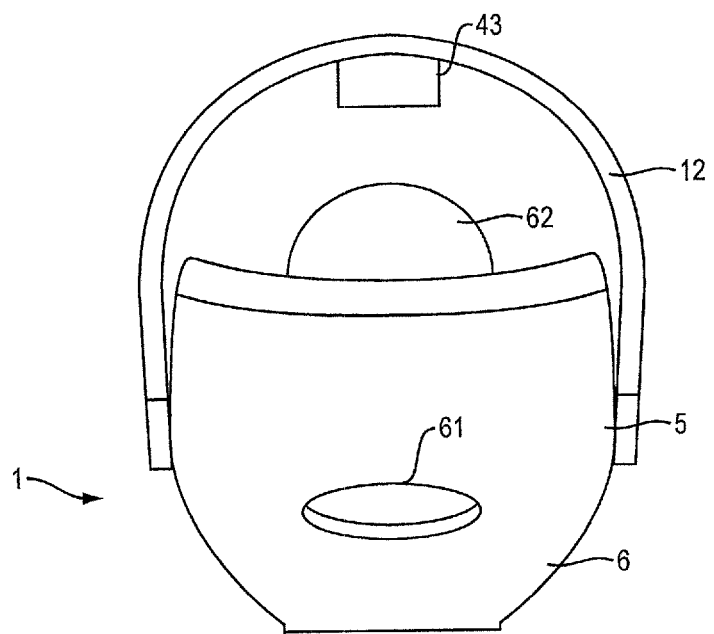
FIG. 5 is a rear view of the child seat of FIGS. 1 and 2.

FIG. 5 illustrates a non-limiting example of a placement of the child monitor 43. Child monitor 43 can be an IR sensor mounted on handle 12, such that its field of view is likely to include a child located in car seat basket 1 (illustrated by child's head 62). The child monitor sensor could be located elsewhere on the car seat or elsewhere in the car, however. For example, the child monitor sensor could be a weight sensor or pressure sensor located underneath the car seat cushion on which the child will sit or lie, and above the hard outer shell of the car seat. FIG. 5 also illustrates car seat carrying indentation-type handle 61 located on the rear 5 of basket 1. The child monitor described herein can be located where desired in or on basket 1 and/or handle 12. For example, they may be located underneath rear 5 of seat shell 6.

Figure 6:
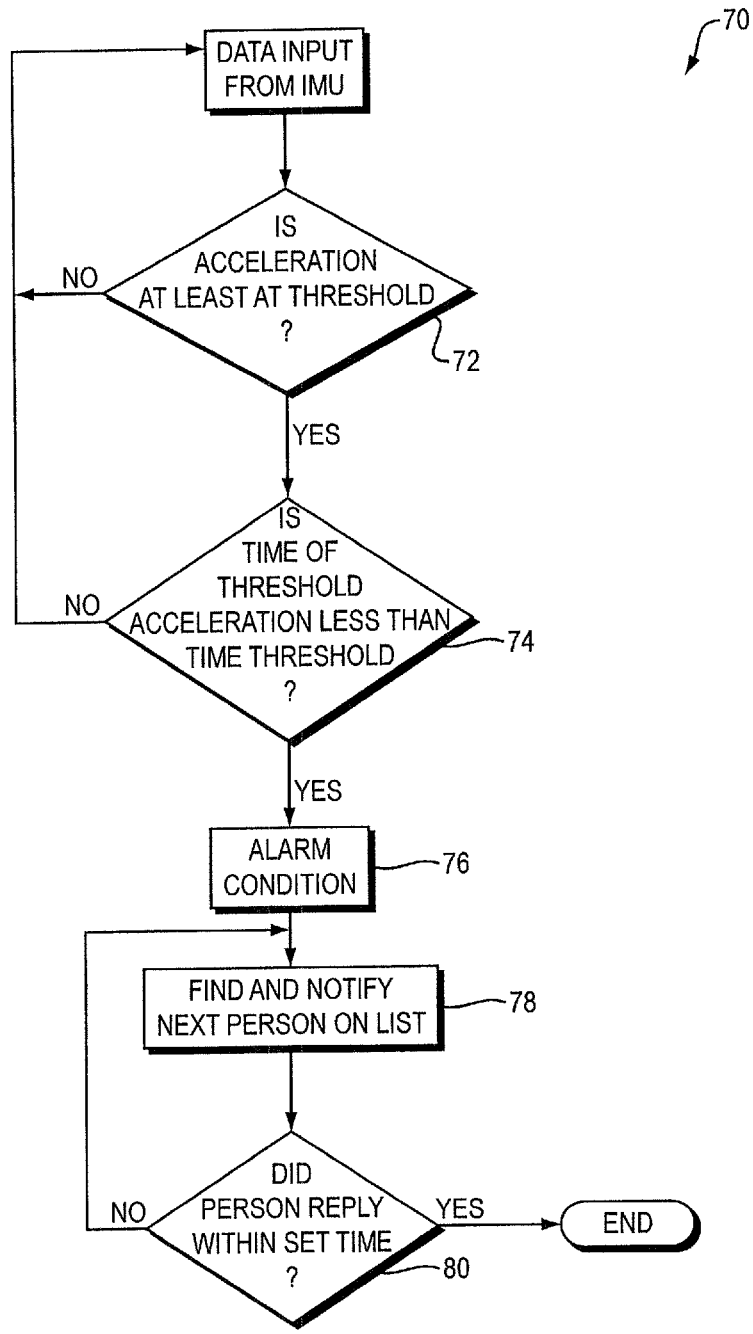
FIG. 6 is a flow chart illustrating steps involved in accident detection and alarm generation.

FIG. 6 is a flowchart illustrating steps involved in an accident detection and alarm generation process 70. Data is input to the microprocessor from the IMU. At step 72, the microprocessor determines if the measured acceleration at least meets a predetermined threshold. If the acceleration is below the threshold, no further action is taken. If the acceleration meets or exceeds the threshold, the microprocessor determines if the time over which the acceleration meets or exceeds the threshold is less than a predetermined time threshold. Time data can be developed by one or more system components, as would be apparent to one skilled in the field, for example in the microprocessor, the GPS unit, and/or the IMU. If the acceleration takes place over a time that meets or exceeds the time threshold, no further action is taken. If the acceleration time is less than the threshold, the microprocessor enters an alarm condition 76.

In an alarm condition, the microprocessor is enabled to review a list of third parties stored in memory and find the next person/contact on the list, step 78. The microprocessor then causes the communications module to send an alarm notification to the person/contact, such as by SMS or email message. The alarm notification can have a desired content, such as indicating that the child (or child seat) has been in an accident, and providing the location as determined by the GPS module. Alternatively, more than one person could be found and notified. The microprocessor then waits for a predetermined, set, time, for a reply from the person contacted, step 80. If the person does not reply, operation returns to step 78 to find and then notify the next person on the list. Steps 78 and 80 can be repeated until a person responds, at which point process 70 ends.

In one non-limiting example, a series of notification actions are taken by the processor and the communications device, upon detection of an accident. In case of a regular accident, the driver will receive a pop up notification on a mobile device app (further described below), asking if they need help. With the press of a button on the mobile device the recipient would be able to call emergency services. This provides the advantage of not having to remember numbers when in stress or shock. Also, if the driver does not reply in (e.g.) 1 minute, a notification would automatically be sent to emergency services (this feature may be available by country if such emergency calls are allowed), and after (e.g.) 5 minutes, the first emergency contact. The reason for this is to allow some head-start time to the emergency services to arrive to the scene. If the accident is measured as severe (e.g., the car rolling over, tumbling, getting inverted, etc.), then the pop-up notification on the driver's phone would be bypassed, and emergency services would be immediately called directly, and afterwards the emergency contact, as described above. Also, a notification could be sent to the car insurance company so they could go to the scene. This can facilitate quick claim settlement.

The car seat system can record data in memory. Data can be logged, that is, recorded over time. For example, acceleration, rotation, and event-time data can be logged, as can speed data (e.g., as determined by GPS or by other means). Speed and/or location and/or acceleration/rotation data can be useful in accident forensics, for example to help determine a cause of an accident. Further, if the seat is detected to have been in a crash, the serial number (or another unique identifier) of the seat can be sent to a database maintained by a third-party, such as the seat manufacturer. The seat is now considered unsafe. The seat can also have a QR code or another unique identifier than can be scanned. If the seat is re-sold, a buyer can check if the seat is safe or not before purchasing by scanning the QR code, which then checks the database and reports if the seat has been in an accident. If the seat is used after an accident, when there is an automatic pre-use safety check, the person would be informed via the app not to use the seat. If the seat has been in an accident, internal damage might occur, and it could be sold used. A person might buy it, use it, and get involved in an accident where the seat will not have the same mechanical performance. These issues can be solved by the second-hand buyer scanning a QR code located in the handle. This would open a link in the browser with safety information about the seat.

Figure 7:
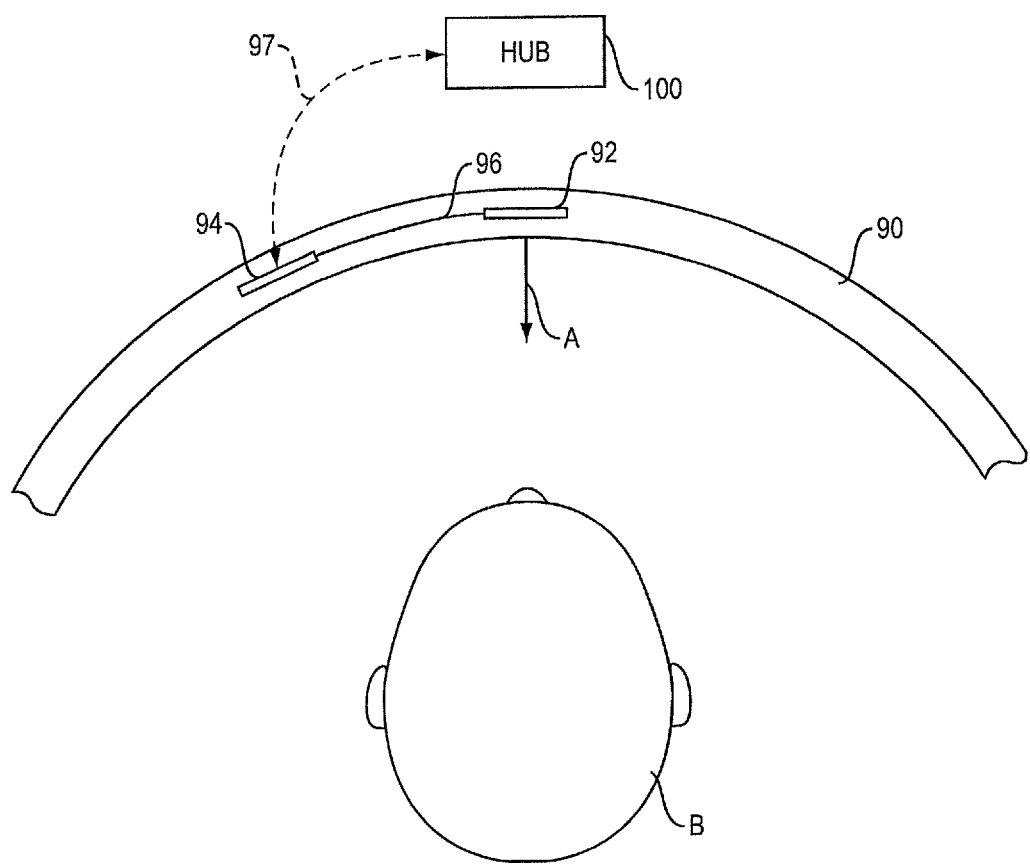
FIG. 7 is a schematic, partial, cross-sectional view of the handle of a car seat, illustrating components of an accident monitoring system.

There are many physical forms and component arrangements that can be used to accomplish the accident monitoring and notification. Components can be located anywhere on or in the car seat. One non-limiting example of component placement is shown in FIG. 7, which is a schematic, partial, cross-sectional view of the handle 90 of a car seat, illustrating components of an accident monitoring system/device. Main PCB 94 is located in car seat handle 90, and is connected to peripheral PCB 92 (which is also located in the handle) by cable 96. The battery power source is not shown. Main PCB 94 can carry the microprocessor, the battery power source, a Bluetooth Low-Energy (BLE) transceiver, and an RF transceiver. Peripheral PCB 92 can carry an IR sensor that is arranged to look down in the direction of arrow "A" to detect a child, schematically depicted by head "B."

The accident monitoring can include one or more accelerometers and/or rotation sensors, such as may be provided by one or more IMUs. In one example, multiple IMUs are used. There is a low-g accelerometer and a high-g accelerometer carried by PCB 92. There can also be a remote component located or mounted elsewhere in the motor vehicle, called a hub 100. Hub 100 can communicate with the main processor on PCB 94 via wireless link 97, such as by Bluetooth, BLE, proprietary RF, or a GSM link, for example. Hub 100 can carry one or both of a low-g and a high-g accelerometer, to provide redundant acceleration sensing to reduce the occurrence of false accident detections. When one or more accelerometers or rotation sensors in more than one location (such as in the car seat and in a hub attached to another surface of the vehicle such as the rear windscreen) are used, the main processor is enabled to interrogate both sensors, and confirm an accident only if they both meet the predetermined acceleration and/or rotation conditions.

Accident detection may make use of high g accelerometers located in various parts of the system, such as an IMU of PCB 92 which is incorporated into a seating component of the system, and a high g accelerometer of PCB 94, if present. An accident detection algorithm can be running on the processor of main PCB 94 (which is in communication with the IMU of PCB 92 via wired connection 96). If the processor determines that the acceleration sensed by the IMU of PCB 92 exceeds a preset threshold acceleration representative of a minimum level of acceleration associated with an accident condition, the processor can trigger a local and/or a remote alarm that an accident has occurred. The alarm may be audible, visual, or both. The processor could communicate with various parts of the system to cause audible or visual outputs on different system components. If an audible or visual output device is present on PCBs 92 or 94, an output could be caused directly by the processor. Alternatively, or additionally, the processor could communicate via a wireless link to hub 100 via proprietary RF, Bluetooth, or GSM wireless communication links, for example, and audible and/or visual alarm outputs could be generated by audible/visual output subsystems incorporated on hub components. The alarm could cause a buzzer on PCB 92 or 94 to output an audible signal. The alarm could cause an LED on PCB 92 or 94 to visibly output an alarm condition (such as by flashing red). The alarm could cause the hub 100 to display a visual warning of a problem that can be seen from outside the vehicle. The hub may also output an audible alarm. The alarm can also be wirelessly (e.g., by BLE) communicated to a key fob, not shown. The key fob may also output visual and audible signals indicating the alarm condition. The microprocessor may also initiate communication with a remotely located device, such as a smartphone, tablet, personal computer and the like, sending a message to the remote device that a problem conditions exists.

A processor of hub 100, if a high g accelerometer is present in hub 100, may also run an accident detection algorithm. By including sensors capable of withstanding high levels of acceleration in both the seating component and the hub components of the system, accident detection reliability can be improved. When accident detection algorithms are running simultaneously on a processor of hub 100 and a processor of PCB 94 or 92, their outputs can be compared before making a determination that an accident has occurred. Only if both algorithms determine an accident has occurred is an alarm condition triggered. This reduces the chances of false alarms arising from accidently hitting, dropping, or subjecting a seating component to a high g shock that is not caused by an accident condition.

The accident monitoring can include a mobile app that runs on a mobile device (e.g., a tablet or smartphone) and is configured to communicate with the system described above. The mobile device may have (and often will have) motion sensors such as one or more accelerometers and one or more rotation sensors, and will always include a processor. In this case, then, the mobile device can run the same crash detection algorithm as the car seat, using the mobile device's own motion data. Using APIs, the mobile device can communicate with other driving-related apps, such as Android Auto and various GPS navigation apps, to determine when the user of the mobile device is driving or is in the car. In this case, the mobile device app can communicate with the car seat accident detection system. In the case of an accident as determined by the mobile device app, a comparison can be made to the data from and the conclusions reached by the car seat concerning an accident. This allows the mobile device to effectively verify the accident conclusion made by the car seat system, which can improve the accuracy of the notifications sent out by the car seat system. Also, the mobile device app can allow the user to dismiss an accident notification (e.g., to end process 70, FIG. 4, during steps 76, 78, and 80) if the recipient is sitting in the motor vehicle and receives an accident notification from the car seat, but no accident has occurred, or if the recipient is for any reason aware that an accident has not occurred.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together, or at different times. The elements that perform the activities may be physically the same or proximate one another, or may be physically separate. One element may perform the actions of more than one block.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A child safety seat accident detection system, comprising:
   a device for determining an acceleration of the seat; and
   a processor, operably connected to the device for determining an acceleration of the seat, and that is configured to judge, based at least on the determined acceleration, if the seat has been in a motor vehicle accident,
   wherein the device for determining an acceleration of the seat comprises an inertial measurement unit (IMU) that comprises at least one accelerometer and at least one rotation sensor.

2. The child safety seat accident detection system of claim 1, wherein the seat comprises a seat body, and a handle coupled to the seat body, and wherein the device for determining an acceleration of the seat is located on or in the seat body or the handle.

3. The child safety seat accident detection system of claim 1, wherein the processor is configured to judge if the seat has been in a motor vehicle accident based on both the determined acceleration and a time over which an acceleration has occurred.

4. The child safety seal accident detection system of claim 3, wherein the processor judges that the seat has been in a motor vehicle accident if the determined acceleration at least meets a threshold acceleration, and the time is less than a threshold time.

5. The child safety seat accident detection system of claim 4, wherein the processor judges that the seat has not been in a motor vehicle accident if the determined acceleration is less than the threshold acceleration, or the time is at least as great as the threshold time.

6. The child safety seat accident detection system of claim 1, further comprising a wireless communication device that is operably coupled to the processor, wherein the wireless communication device is configured to send an accident notification to a third party.

7. The child safety seat accident detection system of claim 6, wherein the processor is further configured to search for pre-established third-party contact persons, and then enable the communication device to send the accident notification to at least one such third party.

8. The child safety seat accident detection system of claim 7, wherein the communication device is configured to send the accident notification by a short message service (SMS) form.

9. The child safety seat accident detection system of claim 8, wherein the processor is further configured to await a reply from the contacted person, and if no reply is received within a predetermined time to enable the communication device to send the accident notification to another person.

10. The child safety seat accident detection system of claim 6, further comprising a mobile device application that runs on a mobile device and is configured to communicate with the processor, wherein the mobile device application is configured to allow the user to dismiss an accident notification if the recipient is in the motor vehicle and receives an accident notification from the car seat, but no accident has occurred.

11. The child safety seat accident detection system of claim 1, further comprising a global positioning system (GPS) device that is configured to determine a position of the child safety seat and provide the position to the processor.

12. The child safety seat accident detection system of claim 11, wherein the GPS device comprises a GPS antenna and a GPS sensor operably connected to the GPS antenna, wherein the GPS antenna is configured to receive GPS satellite signals, and the GPS sensor is configured to determine a position based on the satellite signals and input position information to the processor.

13. The child safety seat accident detection system of claim 1, further comprising a child detection device that is configured to detect whether or not a child is located in the child safety seat.

14. The child safety seat accident detection system of claim 13, wherein the child detection device comprises an infrared sensor.

15. The child safety seat accident detection system of claim 13, wherein the child safety seat comprises a basket, and a handle coupled to the basket, and wherein the child detection device is located in the handle.

16. The child safety seat accident detection system of claim 13, wherein the child detection device comprises a proximity sensor.

17. A child safety seat accident detection system, comprising:
   an inertial measurement unit (IMU) that comprises at least one accelerometer for detecting acceleration and at least one rotation sensor for detecting rotation, where the IMU is located in or on the child safety seat;
   a processor, operably connected to the IMU, and that is configured to judge, based at least on one of a determined acceleration and a determined rotation, if the seat has been in a motor vehicle accident, wherein the processor is configured to judge if the seat has been in a motor vehicle accident based on both the determined acceleration and a time over which an acceleration has occurred, wherein the processor judges that the seat has been in a motor vehicle accident if the determined acceleration at least meets a threshold acceleration, and the time is less than a threshold time, and wherein the processor judges that the seat has not been in a motor vehicle accident if the determined acceleration is less than the threshold acceleration, or the time is at least as great as the threshold time;

a global positioning system (GPS) device that is configured to determine a position of the child safety seat and provide the position to the processor, wherein the GPS device comprises a GPS antenna and a GPS sensor operably connected to the GPS antenna, wherein the GPS antenna is configured to receive GPS satellite signals, and the GPS sensor is configured to determine a position based on the satellite signals and input position information to the processor; and a wireless communication device that is operably coupled to the processor, wherein the wireless communication device is configured to send an accident notification to a third party, wherein the accident notification includes the position of the child safety seat.

18. The child safety seat accident detection system of claim 17, wherein the seat has a seat body and a handle coupled to the body, wherein the IMU is in the handle.

19. The child safety seat accident detection system of claim 18, further comprising a hub located in the motor vehicle and comprising a hub IMU, where the hub is configured to wirelessly transmit accelerations sensed by the hub IMU to the processor.

* * * * *